United States Patent [19]
Hamade et al.

[11] Patent Number: 5,876,526
[45] Date of Patent: Mar. 2, 1999

[54] AUTOMOTIVE FLAT TIRE REPAIR SYSTEM IMPROVEMENT

[75] Inventors: Thomas A. Hamade, P.O. Box 2963, Farmington Hills, Mich. 48333-2963; Fahad H. M. Alkuwaliet, Hail, Saudi Arabia

[73] Assignees: Quantum Electronics, Inc.; Thomas A. Hamade, Canton, Mich.

[21] Appl. No.: 660,453

[22] Filed: Jun. 7, 1996

[51] Int. Cl.$^6$ .................................................. B60C 23/00
[52] U.S. Cl. .......................... 152/416; 60/407; 173/93.5; 152/415; 254/126
[58] Field of Search ................... 152/416, 415; 254/126; 60/407; 173/93.5

[56] References Cited

U.S. PATENT DOCUMENTS

| | | | |
|---|---|---|---|
| 1,045,760 | 11/1912 | Vinson | 152/416 |
| 1,241,696 | 10/1917 | Arnett | 152/416 |
| 1,627,654 | 10/1927 | Lewis . | |
| 1,714,464 | 5/1929 | Merriman | 254/126 |
| 1,731,254 | 10/1929 | McNab . | |
| 1,846,784 | 2/1932 | Borochoff . | |
| 1,954,558 | 4/1934 | Conrad | 254/126 |
| 1,994,015 | 3/1935 | Curran | 254/126 X |
| 2,090,089 | 8/1937 | Wiegand | 152/416 |
| 2,216,854 | 10/1940 | Sanford | 152/416 |
| 2,328,970 | 9/1943 | Farquhar | 152/415 X |
| 2,486,124 | 10/1949 | Crockett | 227/61 |
| 2,579,048 | 12/1951 | Paul | 152/416 |
| 2,627,371 | 2/1953 | Bernal | 230/41 |
| 3,102,573 | 9/1963 | Van Winsen et al. | 152/416 |
| 3,317,187 | 5/1967 | Steppon | 254/126 |
| 3,350,113 | 10/1967 | Graham | 152/416 X |
| 3,365,014 | 1/1968 | Clingerman et al. | 180/54 |
| 3,528,679 | 9/1970 | Gant | 152/416 X |
| 3,844,319 | 10/1974 | Cristante | 141/38 |
| 3,912,022 | 10/1975 | Smith | 173/93.7 |
| 4,030,294 | 6/1977 | Ishida | 60/407 |
| 4,055,329 | 10/1977 | Hammond | 254/126 X |
| 4,154,279 | 5/1979 | Tsuruta | 152/416 |
| 4,255,090 | 3/1981 | Pratt | 417/53 |
| 4,653,727 | 3/1987 | Chang et al. | 254/126 X |
| 4,763,709 | 8/1988 | Scholer | 152/416 |
| 4,815,758 | 3/1989 | Yoshida | 152/416 X |
| 4,872,230 | 10/1989 | Levine | 254/126 X |
| 5,097,875 | 3/1992 | Grenie et al. | 141/38 |
| 5,158,266 | 10/1992 | Alten | 254/126 |
| 5,230,609 | 7/1993 | Tsene et al. | 417/237 |
| 5,315,974 | 5/1994 | Sabelström et al. | 123/320 |
| 5,346,180 | 9/1994 | Popowich | 254/126 |
| 5,657,964 | 8/1997 | Yoshida | 254/126 |
| 5,722,641 | 3/1998 | Martin et al. | 254/423 |

*Primary Examiner*—Francis J. Lorin

[57] ABSTRACT

An on-board storable system for repairing a flat tire on an automobile comprising a utensil adapted to endow a power impact wrench to actuate a scissors jack. Such system preferably includes an air compressor for inflation of a replacement tire after mounting the wheel bearing the replacement tire has been secured to the hub with the impact wrench. An alternative system utilizing the utensil and a power impact wrench comprises an air reservoir; compressor; electro-mechanical means for driving the compressor; a pneumatic distribution system; the pneumatic distribution system conveying air from said reservoir to an air distribution post for each wheel of the automobile; and tubular means for conveying air from said posts to a tire proximate each said post. The electro-mechanical power transmission means being selected from the group comprising an engine driven belt powered pulley; an auxiliary battery and associated electric motor; and an electric motor driven by the automobile electric system. The power impact wrench can be either electrically driven or pneumatically driven by air ducted from said air reservoir. A vehicle hoist is powered by a source from the group comprising a mechanical hoist driven by a pneumatic power tool driven by air from said reservoir; a hydraulic hoist driven by an air powered tool powered by air from said reservoir; an electric hoist powered by said auxiliary battery; and an electric hoist driven by a hot wire from the battery to a convenient terminal. In both the preferred and alternative embodiments, a power impact wrench being operable to torque and detorque threaded fasteners anywhere on the automobile, including the lug nuts holding a wheel to a hub.

13 Claims, 4 Drawing Sheets

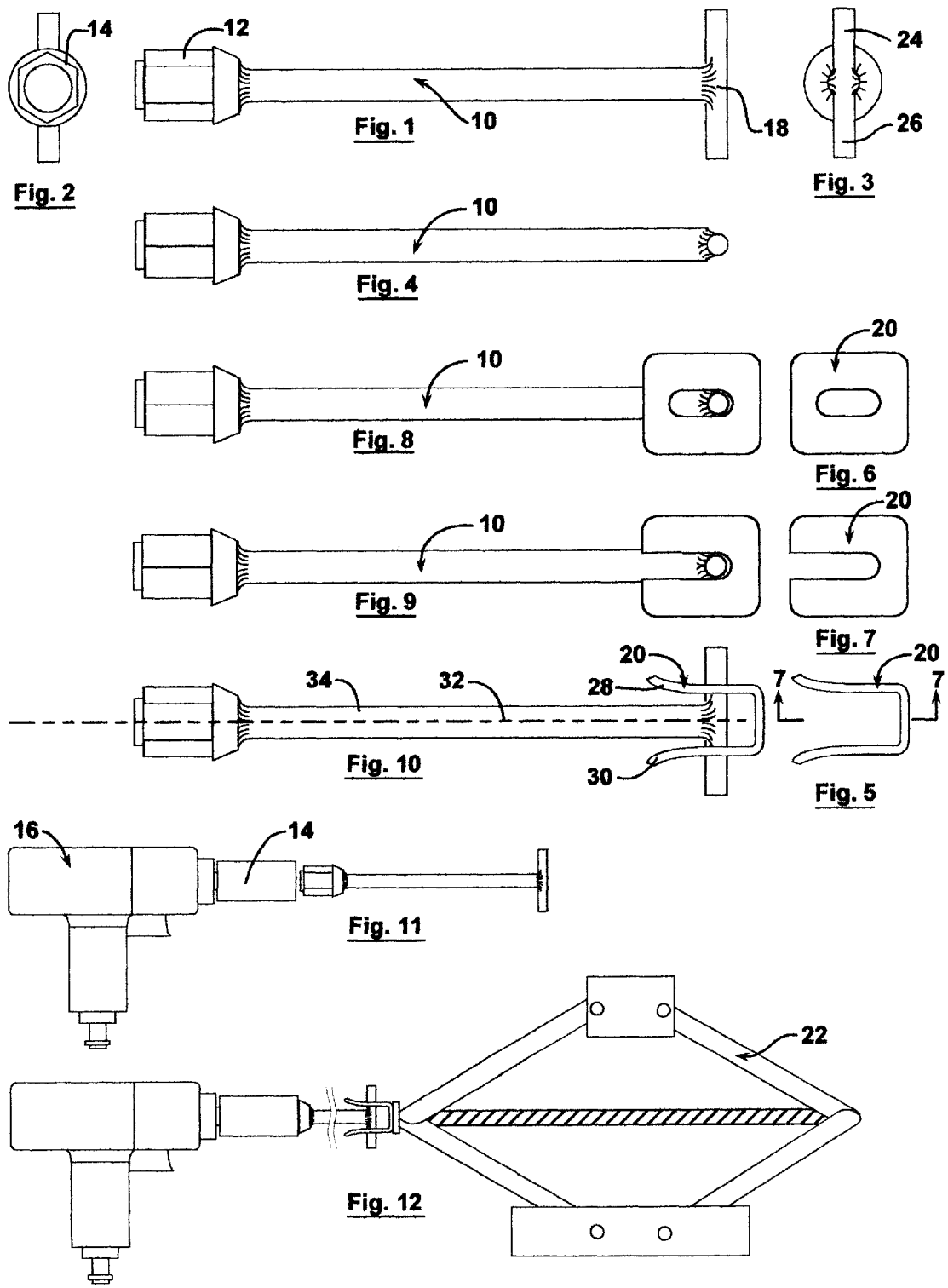

AUTOMOTIVE FLAT TIRE REPAIR SYSTEM IMPROVEMENT

BACKGROUND OF THE INVENTION

This invention relates generally to on-board automotive tire changing systems. More particularly, this invention relates to a system utilizing a utensil adapting a power impact wrench to power actuate a hoist. The system is powered alternatively from the on board electrical system, or engine driven pulley of a vehicle, or an inverter, or a supplementary battery driven power source that can be readily stored within the vehicle cabin or boot. Prior efforts to provide and store on-board all of the necessary elements for inflating or changing a tire, and for adding or removing vehicular equipment fastened by threaded fasteners, often highly torqued, have not provided for power actuation of a hoist or have been bulky, required extensive time to marshall, assemble, and utilize, or were readily available and utilizable but required overly extensive time to accomplish the task, or were so under powered, were unable to complete a task within a reasonable time. Additionally, where the vehicle had to be hoisted, no powered means or very complex and expensive mechanical-hydraulic means were needed.

U.S. Pat. No. 5,315,974 issued in 1994 to Sabelstrom et al, assigned to Volvo of Goteborg, Sweden, is entitled: INTERNAL COMBUSTION ENGINE WITH COMPRESSOR FUNCTION. A cylinder of an internal combustion engine compresses air and delivers it through an extra exhaust valve processing intake air. This device requires extensive engine modification to utilize and does not provide sufficient air flow under pressure to inflate a flat tire within a reasonable time. No air reservoir is provided. No showing of means for hoisting. No means for jacking is provided. No showing of means utilizing a pneumatic motor for either hoisting jacking, or torquing or detorquing threaded fasteners is provided. No electrically driven motor for compression, hoisting, jacking, or detorquing is provided. No hint of a utensil adapting an impact wrench to drive a scissors jack.

U.S. Pat. No. 5,230,609 issued in 1993 to Tseng et al is entitled: AIR BRAKE SYSTEM FOR A VEHICLE. No means for jacking is provided. An air brake system for trucks receiving pressurized air to a brake air tank from a cylinder of the engine is disclosed. The brake air tank serves as a reservoir. No means for hoisting is provided. No pneumatic motor for either hoisting, jacking, or torquing or detorquing threaded fasteners is provided. No electrically driven motor for compression, hoisting, jacking, or torquing or detorquing is provided. No hint is made of a utensil adapting an impact wrench to drive a scissors jack.

U.S. Pat. No. 5,097,875 issued in 1992 to Grenie et al, assigned to Michelin of Clermont-Ferrand. France is entitled: PORTABLE REINFLATOR. Pressurized air is continuously supplied to a tire when the tire is rotating. A compressor is driven by the vehicle electrical system. No air reservoir is supplied. A hose must be precisely centered on the axis of rotation of the wheel to prevent fouling of the hose delivering air to the tire. No auxiliary electrical supply to a compressor is disclosed. No hoisting, jacking, or torquing or detorquing or pneumatic motor is disclosed. No hint is made of a utensil adapting an impact wrench to drive a scissors jack.

U.S. Pat. No. 4,763,709 issued in 1988 to Scholer, assigned to Teledyne Industries of Los Angeles Calif., is entitled: TIRE INFLATION SYSTEM. Load sensing governing tire pressure continuously is disclosed. No hoisting, jacking, or torquing or detorquing or pneumatic motor is disclosed. No auxiliary electrical power source is disclosed. No pulley driven compressor is disclosed. No hint is made of a utensil adapting an impact wrench to drive a scissors jack.

U.S. Pat. No. 4,255,090 issued in 1981 to Pratt is entitled: MANUFACTURE OF POWERED AIR COMPRESSORS. An internal combustion engine is modified with a head insert modification to provide an air compressing cylinder. No air reservoir is provided. No means for hoisting is provided. No means for jacking is provided. No means utilizing a pneumatic motor for either hoisting, jacking, or torquing or detorquing threaded fasteners is provided. No electrically driven motor for compression, hoisting, jacking, or torquing or detorquing is provided. No hint is made of a utensil adapting an impact wrench to drive a scissors jack.

U.S. Pat. No. 3,844,319 issued in 1974 to Cristante is entitled: PUMP ATTACHABLE TO AN AUTOMOBILE EXHAUST. A tire pump utilizing car exhaust is disclosed. No air reservoir is provided. No means for hoisting is provided. No means for jacking is provided. No means utilizing a pneumatic motor for either hoisting, jacking, or torquing or detorquing threaded fasteners is provided. No electrically driven motor for compression, hoisting, jacking, or torquing or detorquing is provided. No hint is made of a utensil adapting an impact wrench to drive a scissors jack.

U.S. Pat. No. 3,365,014 issued in 1968 to Clingerman et al, assigned to Cummins Engine of Columbus, Ind., is entitled: COMBINATION VEHICLE ENGINE AND SELF-POWERED AIR COMPRESSOR. A system provides an internal combustion engine with selective internal air compressor capability. A diesel engine has a valve dedicated to compression and supplies an air tank. Extensive internal modification of an engine is required to provide an air compressor. No electrically driven air compressor is disclosed. No battery driven compressor is disclosed. No auxiliary electrical source to drive a compressor is disclosed. No hoist, jack torquing or detorquing or pneumatic motor is disclosed. No pneumatically driven hydraulic actuation is disclosed. No hint is made of a utensil adapting an impact wrench to drive a scissors jack.

U.S. Pat. No. 2,627,371 issued in 1953 to Bernal is entitled: ENGINE COMPRESSOR CONTROL. An internal combustion engine is converted for cylinders to run as an air compressor. No air reservoir is provided. No means for hoisting is provided. No means for jacking is provided. No means utilizing a pneumatic motor for either hoisting, jacking, or torquing or detorquing threaded fasteners is provided. No electrically driven motor for compression, hoisting, jacking, or torquing or detorquing is provided. No utensil adapting an impact wrench to drive a scissors jack is disclosed.

U.S. Pat. No. 2,486,124 issued in 1949 to Crockett is entitled: AIR COMPRESSOR VALVE DEVICE. A valve port to replace a spark plug of an internal combustion engine cylinder to provide compressed air is disclosed. No air reservoir is provided. No means for hoisting is provided. No means for jacking is provided. No means utilizing a pneumatic motor for either hoisting, jacking, or torquing or detorquing threaded fasteners is provided. No electrically driven motor for compression, hoisting, jacking, or torquing or detorquing is provided. No hint is made of a utensil adapting an impact wrench to drive a scissors jack.

U.S. Pat. No. 1,846,784 issued in 1932 to Borochoff is entitled: AUTOMOBILE TIRE PUMP. An air pump driven by an automobile engine is disclosed. The fan belt of an engine drives a transmission delivering rotation to the pump. The pump can be selectively disconnected from the transmission. No reservoir is disclosed. No hoist, jack, torquing or detorquing or pneumatic motor is disclosed. No electrically driven pump is disclosed. No separate air terminal for each wheel is disclosed. No hint is made of a utensil adapting an impact wrench to drive a scissors jack.

U.S. Pat. No. 1,731,254 issued in 1929 to McNab is entitled: JACK. An engine driven hydraulic pump hydrostatically driving a hydraulic jack located at an axle adjacent wheels for lifting those wheels off the ground is disclosed. No pneumatic system of any sort is disclosed. No pneumatic components of any sort are disclosed. No electrically driven member of any sort is disclosed. No means for inflating tires is disclosed. No utensil adapting an impact wrench to drive a scissors jack is disclosed.

U.S. Pat. No. 1,627,654 issued in 1927 to Lewis is entitled: VEHICLE ATTACKED AND OPERATED TIRE PUMP. A pump driven by the crankshaft of the car is provided. No pneumatic reservoir is provided. No hoist, jack, torquing or detorquing or pneumatic motor is provided. No electrical driven pump is disclosed. No electrical component or system is disclosed. No hydraulic system is disclosed. No hint is made of a utensil adapting an impact wrench to drive a scissors jack.

Another example of a prior art effort is a General Motors provision of an air system to service shock absorbers. This system is incapable of delivering enough air to pump tires in a short time nor is there disclosure of driving a pneumatic tool to detorque wheel lugs. There is no aspect of this device giving a hint of a utensil adapting an impact wrench to drive a scissors jack.

Another example of a prior art device is a tire pump, such as the Enginair Power Tire Pump manufactured by G. H. Meiser & Company of Posen, Ill., that connects to the spark plug hole of an engine. This requires removal of the spark plug, and insufficient air pressure and rate of delivery to fully pump a tire in a few minutes, nor suggestion to power an air tool. No reservoir is provided with this device. This device gives no hint of a utensil adapting an impact wrench to drive a scissors jack.

Another example of a prior art is a portable tire pump, such as the Interdynamics, Inc. Model number LFB-250 air compressor that can be powered from the cigarette lighter insert of a motor vehicle. This compressor does not provide an air reservoir. This compressor is incapable of delivering enough air to drive pneumatic tools to detorque wheel lugs. This device gives no hint of a utensil adapting an impact wrench to drive scissors jack.

It is an object of this invention to provide a system that can be utilized to jack, hoist, torque, detorque, and drive mechanical accouterments driven by an impact wrench with an adapter to perform some of these tasks.

It is a further object of this invention to provide a pneumatic system for an automobile, including a pneumatic reservoir, that can be powered either directly through a terminal readily communicative with the electrical system of an automobile already manufactured, or with an auxiliary battery pack having sufficient stored energy to drive the pneumatic system to readily inflate a tire or lift a wheel within a few minutes.

It is a further object of this invention to provide a pneumatic system that can drive a hydrostatically actuated component, such as a jack with sufficient power to raise an axle several inches within a very few minutes.

It is a further object of this invention to provide an improved on-board pneumatic system for an automobile for hoisting, jacking, torquing, detorquing, and driving a pneumatic motor that is uncomplicated to manufacture, install, and maintain, and that is relatively inexpensive to manufacture, install, maintain, and utilize.

It is further object of this invention to provide compressed air continuously if needed.

These and other objects of this invention are achieved by providing a system for changing a tire on a motor vehicle comprising a utensil adapting a power impact wrench to power actuate a jack, and also to additionally provide a pneumatic system for an automobile to inflate a tire in a very few minutes and power a pneumatic driven tool to detorque threaded lugs or nuts to remove a wheel from a hub, and generating such power from a battery pack, car battery, alternator or pulley drive from a fan belt, the air delivered to terminal fittings proximate wheel locations.

BRIEF DESCRIPTION OF THE DRAWINGS

FIG. 1 is a top view of a utensil in the preferred embodiment of this invention;

FIG. 2 is a front view of the apparatus shown in FIG. 1;

FIG. 3 is a rear view of the apparatus shown in FIG. 1;

FIG. 4 is a side view of the apparatus shown in FIG. 1;

FIG. 5 is a top view of a rotatable portion of a jack operated in the preferred embodiment of this invention;

FIG. 6 is a side view of the apparatus shown in FIG. 5;

FIG. 7 is a partially transverse sectional view of the apparatus shown in FIG. 5 taken along the section lines 7—7 thereof;

FIG. 8 is a side view of the apparatus shown in FIG. 1 shown in engagement with the apparatus shown in FIG. 6;

FIG. 9 is a side view of the apparatus shown in FIG. 1 shown in engagement with the apparatus shown in FIG. 7;

FIG. 10 is a top view of the apparatus shown in FIG. 1 shown in engagement with the apparatus shown in FIG. 5;

FIG. 11 is a side view of the apparatus shown in FIG. 1 shown in alignment for engagement with an impact wrench in the preferred embodiment of this invention;

FIG. 12 is a broken side view of the apparatus shown in FIG. 1 in engagement with an impact wrench and in engagement with a jack in the preferred embodiment of this invention;

Figure 13:
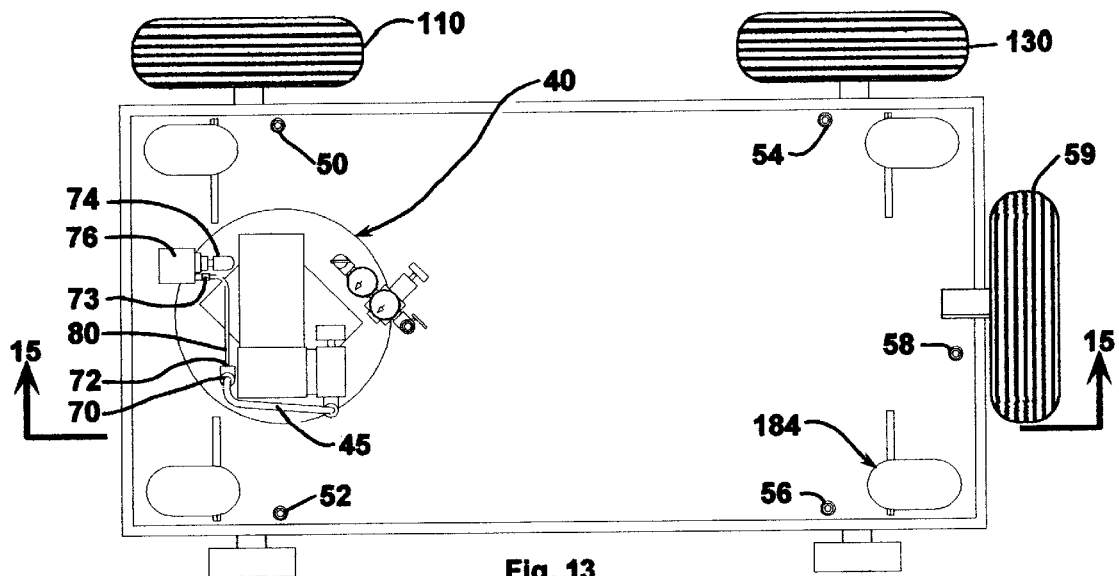
FIG. 13 is a top view of apparatus in an alternative embodiment of this invention.
Figure 15:
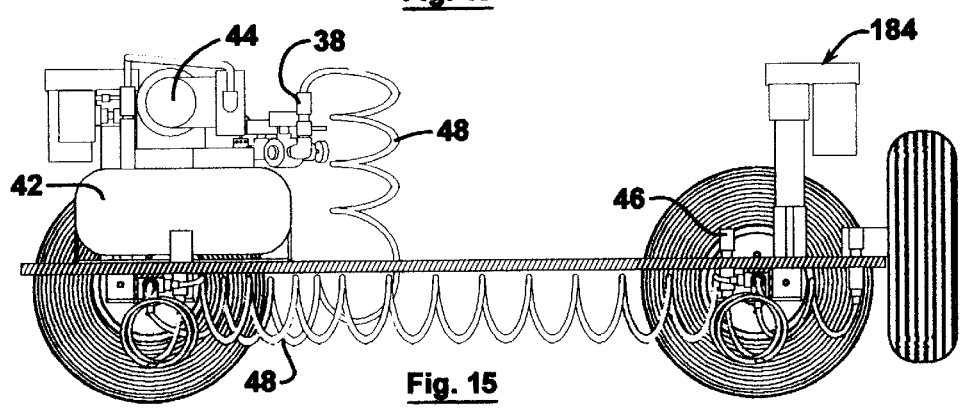
FIG. 15 is a transverse sectional side view of the apparatus shown in FIG. 13 taken along the section lines 15—15 thereof.
Figure 14:
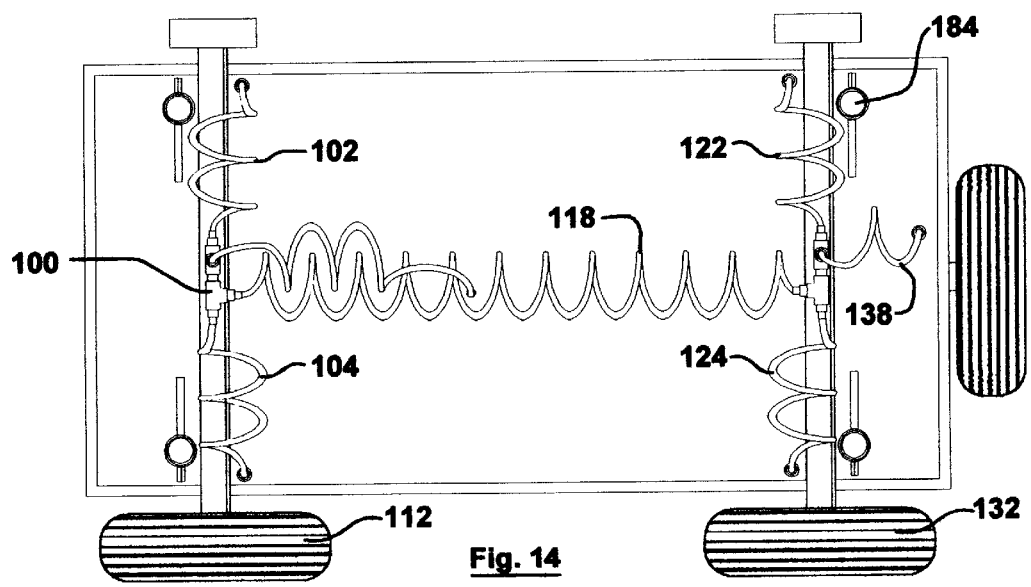
FIG. 14 is a bottom view of a portion of the apparatus shown in FIG. 13.

Before explaining and specifying further attributes of this invention, it is to be understood that the phraseology and terminology employed herein is for the purpose of description and not limitation. Furthermore, the invention can be practiced or carried out in various ways.

DETAILED DESCRIPTION

FIG. 1 is a top view of the preferred embodiment of this invention showing a utensil 10 adapted to engage, in a mechanical male-female relationship, by a hexagonal nut portion or tool engaging portion 12, a corresponding hexagonal female socket or sleeve driven member or regular polygon shaped female socket element 14 of an air power impact wrench or power driven rotating tool 16. The power impact wrench 16 may be such as that marketed by Ingersoll-Rand of Liberty Corner, N.J. Model 21311-2 air impact wrench or Model 8049 electric impact wrench.

The utensil 10 has, integrally, a tee shaped portion 18 operable to engage the rotating driving member or rotatable member 20 of a scissors jack or mechanical hoist 22. The scissors jack 22 may be a mechanical lift such as model T9446-3,300 pounds EZ-LIFT scissors jack manufactured for Shinn Fu Company of America, Inc. of Taiwan, Republic of China.

When the ends 24, 26 of the tee portion 18 of the utensil 10 engages corresponding receiving forks 28,30 of driving member 20 of the scissors jack 22, and the male hexagonal driven male member 12 of utensil 10 is inserted into female sleeve receiver 14 of the wrench 16, and power is applied to wrench 16, the rotation of sleeve 14, driven by wrench 16, is imparted to utensil 10, about the longitudinal geometric axis 32 of utensil 10, rotating rod portion 34 of utensil 10, about axis 32, and causing the tee portion 18, to which rod 34 is integral and fixed, as it is to nut 12, to also rotate about axis 32.

By mechanically engaging and having rotational movement resisted by forks 28,30, ends 24,26 of the tee 18 impart rotation to the forks 28,30, thus actuating jack 22 into hoisting or lowering a vehicle selectively responsive to the clockwise or counter rotation of the wrench 16. In this manner, utensil 10 endows powered actuation of the scissors jack 22 that previously was designed exclusively for manual actuation.

In the preferred method of practicing this invention, an air compressor, such as that marketed by Thomas Industries Inc. of Sheboygan, Wis. that can be powered from the electrical system of a vehicle or from an auxilliary battery, can be utilized to inflate the replacement tire, after the wheel lugs have been detorqued by the wrench 16 and the wheel with a flat tire has been replaced and the lugs retorqued by the wrench 16.

FIG. 13 is a top view of a system utilizing an alternative embodiment of this invention shown generally at numeral 40. The system 40 includes a pneumatic or air reservoir 42 rated at least 175 psi, such as a 2.5 gallon reservoir made by Thomas Industries Inc. A compressor 44 is provided having a capacity of about one cubic foot per minute at about 100 psi, driven by an electric motor 41 having 12 volt DC ⅓ horsepower (248 watts), such as that made by the same company.

Terminal fittings 46 are provided, such as quick disconnect fittings with built in air valves made by Ingersoll-Rand. Hoses 48 connects to system 40 through a fixed terminal 38 such as a quick disconnect fitting made by Ingersoll-Rand and provide compressed air to the terminals 46. These hoses 48 are flexible recoil hoses such as those made by Ingersoll Rand of Liberty Comer, N.J. These hoses 48 connect fittings 46, at locations 50, 52, 54, 56, 58 at the right front, left front, right rear, left rear, and spare tire 59 storage compartment locations, with the reservoir 42. An air impact wrench (not shown), such as Model IR2131-2 made by Ingersoll Rand, has a conduit (not shown) connectable to any one of the terminal fittings 46. The pneumatic wrench cooperates with utensil 10 in rotating into actuation scissors jack 22 in a manner precisely similar to such operation by power impact wrench 16, described supra.

The inlet air of the compressor 44 is connected to an air filter 39. Conduit 45 takes the discharge air of compressor 44 and feeds it directly to the air reservoir 42 through a check valve 70, a type well-known in the art. On the input side 72 of the check valve 70 is a conduit 80 directing air to a pressure relief valve 73 mounted on the pressure switch 76, switch being a type well-known in the art. The pressure switch 76 communicates with the reservoir 42 through conduit 74 in such a manner that when the pressure in the reservoir reaches a pre-determined threshold, preferably 120 psi, the pressure switch 76 open circuits the electric power to the electric motor 41 driving the compressor 44, thus turning off the compressor and momentarily opens a needle valve 73 which is actuated by the impact mechanism of pressure switch 76 to relieve pressure in conduit 80 and the compressor 44.

An outlet 84 from the reservoir 42 communicates with a pressure gauge 86 and a safety pressure relieve valve 88. From the gauge 86 there is a conduit 90 which communicates to a regulator 92. The regulator 92 has a built-in output gauge 94. Gauge 86 reads the pressure in the reservoir 42, and the output gauge 94 reads the pressure after the regulator 92 has selectively determined the output pressure and the flow rate.

An immediate shut-off valve 96 downstream of the regulator 92 provides means for immediately shutting off air output. A drain valve 93 is connected to the bottom of the reservoir 42 to drain any accumulated water moisture. All of the aforementioned valves and regulators can be manually operated or electronically actuated.

The output of the shut-off valve 96 flows to a coiled air hose 98 part of system hoses 48 through an air fitting 38 that can be of the same type as terminal 46 and then to a distribution fitting 100. Separate distribution hoses 102, 104 part of system hoses 48 feed terminal fittings 50, 52 proximate the forward right and left hand wheels 110, 112 respectively. Hose 118 communicates with hoses 122, 124 part of system hoses 48 that communicate, in a manner similar to the forward hoses 102, 104 to terminals 54, 56 proximate rear wheels 130, 132, right and left, respectively. Another hose 138 part of system hoses 48 connects in a similar manner to a terminal fitting 58 proximate the spare tire. All hoses have swivel fittings (not shown) to prevent crimping. All of these terminals connect to fittings 46 and can be quick disconnect couplers and adapters such as those made by Ingersoll Rand. The couplers and adapters connect in a female-male relationship for quick connect and disconnect in a manner well-known in the art.

Figure 16:
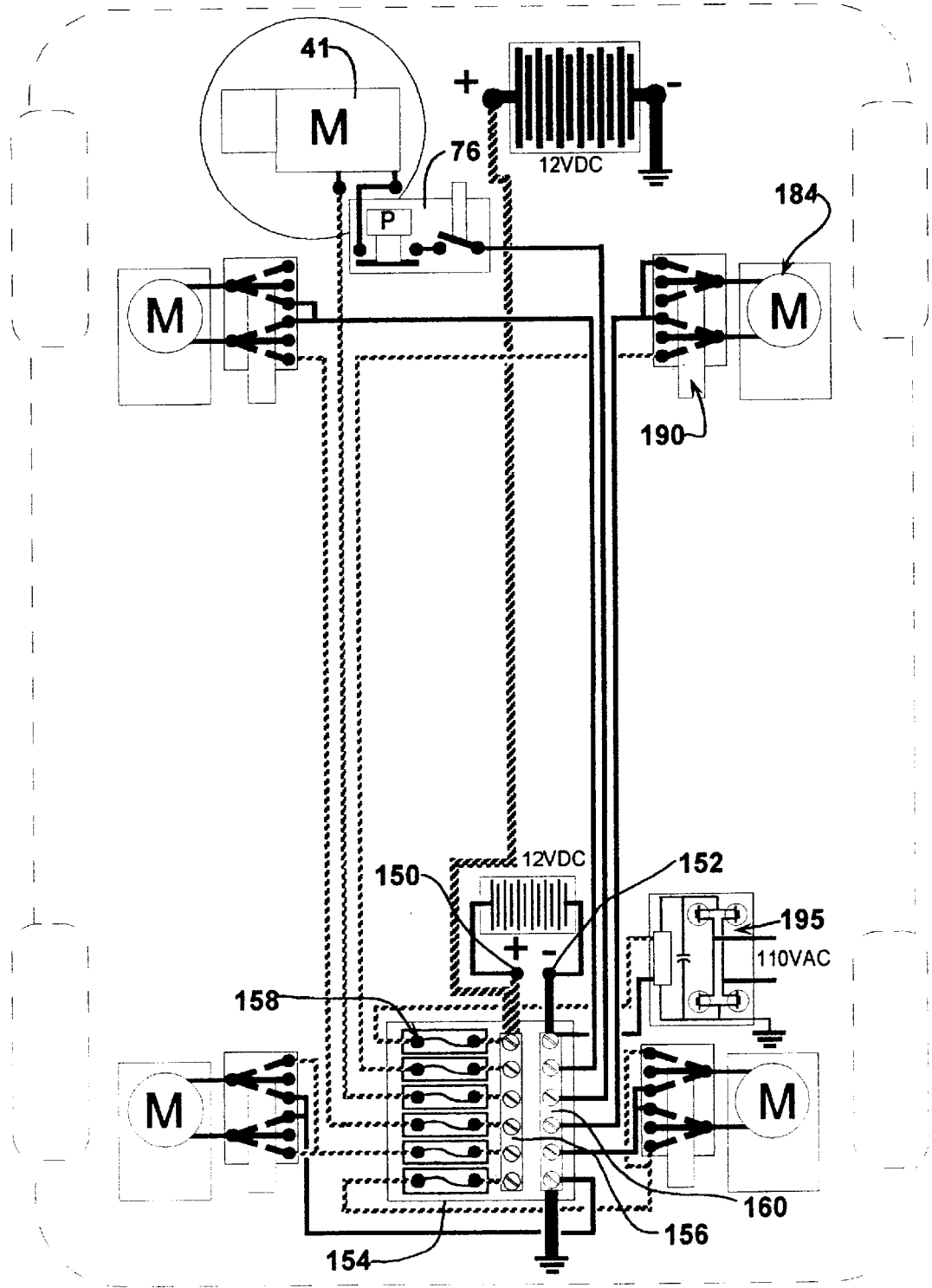
FIG. 16 is schematic diagram of the on-board electrical system utilized in the apparatus shown in FIG. 13.
Figure 17:
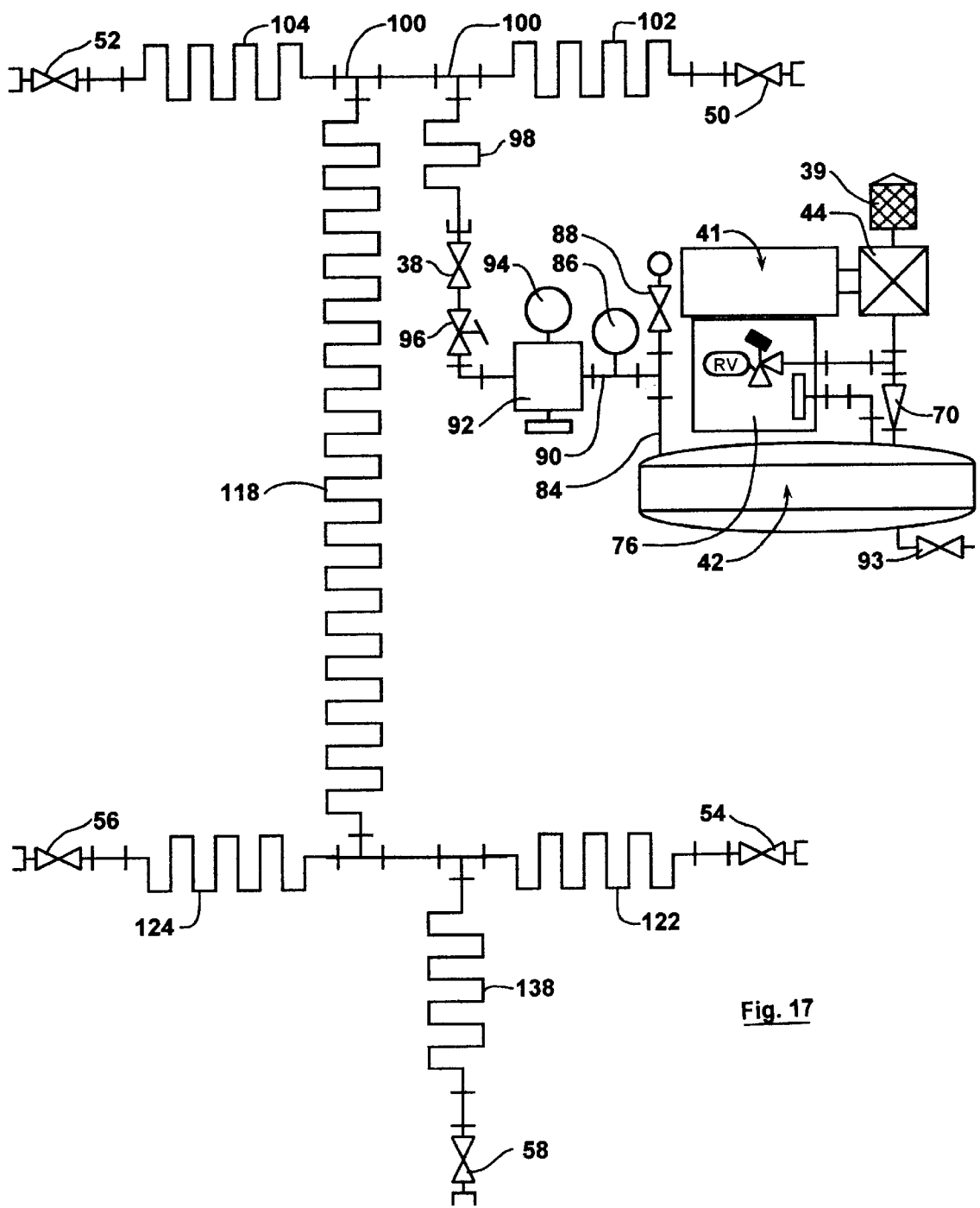
FIG. 17 is schematic diagram of the on-board pneumatic system utilized in the apparatus shown in FIG. 13.

In FIG. 16 electrical system of the vehicle is indicated at terminals 150, 152, positive and negative respectively. One of these wires connects to a fuse box 154. The fuse box 154 has a positive side connected to two positive busses 156, 158. The fuses are between terminals on these two positive busses. One positive bus 156 connects to the positive post of the battery of the vehicle electrical system. The other positive bus 158 connects to separate compressor and hoist electrical terminals. The negative bus 160 connects to the negative post of the battery of the vehicle electrical system. The generic polarity can be reversed dependant on design considerations.

Alternative to the vehicle electrical system being utilized to provide electric power, a battery pack (not shown) may be utilized, such as a 12-volt rechargeable power supply made by Stat Power of Burnaby, British Columbia, Canada, or Clear Line of New Jersey.

In the preferred embodiment of this invention, a pneumatically driven power tool can be fitted with a wrench to torque and detorque wheel lugs. A flexible pneumatic conduit (not shown) can be used to drive the tool, and is connected to a terminal serviced by the output of the reservoir. The same or another pneumatic conduit equipped with a pressure gauge and air valve (not shown) can be used to inflate a flat tire and is connected to a terminal serviced by the output of the air reservoir.

Electric hoist 184 to be powered by the aforementioned electrical busses can be provided at each of the wheel locations and selectively switched by electric switch 190 to go up and down to hoist a vehicle. The hoist power can be alternatively provided through on-board vehicle switches or through remote control electrical system.

In an alternative embodiment of this invention, a hydraulic mechanical jack (not shown) is powered by the pneumatic tool to hoist a corner or side of the vehicle. Such a mechanical jack is Banner model BLH-67129 (12-ton capacity) manufactured by Lincoln, a division of McNeil (Ohio) Corp. This device is driven by this invention pneumatic air system and could not be powered by a pneumatic air compressor, such as small compressor model LFB-250 by Interdynamics, Inc. of Brooklyn, N.Y. or small air compressor kit model CL590 available from Shoppers Advantage of Trumbull, Conn. or through a tire pump model G164 made by Enginair Power/G. H. Meiser and Company of Posen, Ill.

Not only can't the air jack be sufficiently powered by such devices, neither can the air tool acting as an air wrench be so powered.

In an alternative embodiment of this invention, electrical jacks 184 are powered either by the aforementioned electrical terminals of the vehicle electrical system or by the aforementioned battery pack. Such an electrical hoist is model HD Series Ball Screw or Acme-Screw actuators made by Burr Engineering & Development Corporation of Battle Creek, Mich. with lifting capacities of 2500 pounds each.

In a further alternative embodiment of this invention, mechanical or hydraulic jacks may be fixed at each of the aforementioned wheel locations, and powered by either an impact wrench using the utensil 10, or a geared mechanical transmission receiving power electrically from the electrical system of the car or auxiliary battery supply, discussed supra.

In an alternative embodiment of this invention, an inverter 195 is provided to convert 12-volt DC to 60 cycle 120-volt AC such as model PC300 (500 Watt) or higher wattage models manufactured by Clearline Concepts Corporation of Boonton, N.J., to power an electrical impact wrench AC powered tools and other AC devices. The inverter is connected to the vehicle electrical system or to an auxilliary battery via fuse box 154.

In an alternative embodiment of this invention, the electrically driven air compressor can be replaced with an air compressor (not shown) mounted on-board of a vehicle and driven by the mechanical rotation of the vehicle's motor through a built-pulley assembly coupled with the compressor shaft. This separate drive compressor can be such as model 1107CX75, ¾HP, 2.55 CFM at 100 psi compressor manufactured by Thomas Industries, Inc. Such compressor retrofitted with the pneumatic system of this invention is sufficient to deliver compressed air to drive pneumatic tools continuously for torquing and detorquing automobile wheel lugs and fasteners.

From the aforementioned description of preferred and alternative embodiments of this invention, it can be appreciated that a simple system utilizing off-the-shelf commercially available components can be utilized with a novel utensil to adapt an impact wrench to drive a mechanical hoist, to provide substantial pneumatic power to perform a variety of maintenance and service tasks ordinarily unavailable with on-board vehicle components in a readily utilizable, timely, economical fashion that can either be provided as original equipment or readily installable retrofitted after market installation. This is also true of various components, including but not limited to a 12-volt DC compressor that has the capacity to drive heavy duty commercial tool and equipment.

We claim:

1. A system for use in a wheeled vehicle having pneumatic tires, comprising:

an air driven rotating tool;

a scissors jack operable by said air driven rotating tool;

an air compressor;

an air reservoir connected to said air compressor;

an air terminal proximate each of the wheels of the vehicles;

flexible tubular means conveying air from said reservoir to said terminals;

means selectively attaching said rotating tool to one of said terminals;

a tubular member selectively attachable to one of said terminals for conveying air under pressure to a tire on the wheel proximate to said terminal;

means powering said compressor selected from the group consisting of
   mechanically rotating member driven by a pulley powered by a belt driven by the engine of said vehicle,
   and an electric motor powered from a source selected from the group consisting of
   the battery of said vehicle,
   the alternator of said vehicle,
   a generator of said vehicle,
   and a portable battery detachable from the electrical system of the vehicle.

2. The system of claim 1 wherein the system is sufficiently powerful to convey air under sufficient pressure to said tubular member to inflate said tire from a totally deflated condition to sufficient pressure for normal operation of the vehicle.

3. The system of claim 1 wherein the system is sufficiently powerful to convey air under sufficient pressure to said tubular member, in cooperation with said reservoir being of sufficient storage capacity, to inflate said tire from a totally deflated condition to sufficient pressure for normal operation of the automobile.

4. The system of claim 1 wherein said system is sufficiently powerful to convey air under sufficient pressure to said tubular member, in cooperation with said reservoir being of sufficient storage capacity, to jack a tire mounted on the automobile above ground.

5. The system of claim 1 wherein the air tool is useable for detorquing and torquing the lug nuts.

6. The system of claim 1 further comprising an inflatable jack wherein the inflatable jack is connectable to one of the terminals.

7. The system of claim 1 further comprising at least one electrically operated jack operable by connecting to the vehicle electrical system or to a portable battery or to an external power source.

8. The system of claim 7, wherein at least one electrical jack is attached to the vehicle.

9. The system of claim 1 further comprising electric power tools connectable to the vehicle electrical system or to a portable battery or inverter or to an external electrical source.

10. The system of claim 1 wherein the air power tool is connected to the scissors jack by a connector.

11. The system of claim 10 wherein the connector includes a jack engaging portion comprising times and a tool engaging portion having a polygon cross-sectional shape.

12. In a pneumatic system in and for an automobile, the improvements comprising the system of claim 1 and:

flexible tubular means providing air under pressure from said reservoir to a terminal proximate the spare tire location compartment of said vehicle.

13. The system of claim 6 wherein said system is sufficiently powerful to convey air under sufficient pressure to said tubular member, in cooperation with said reservoir being of sufficient storage capacity, to jack a tire mounted on the automobile above the ground.

* * * * *